United States Patent
Harris et al.

(10) Patent No.: US 7,084,613 B2
(45) Date of Patent: Aug. 1, 2006

(54) MULTIPHASE DC-DC CONVERTER WITH REDUCED RIPPLE

(75) Inventors: Matthew B. Harris, Durham, NC (US); James W. Leith, Seattle, WA (US); Brandon D. Day, Seattle, WA (US)

(73) Assignee: Intersil Americas Inc., Milpitas, CA (US)

( * ) Notice: Subject to any disclaimer, the term of this patent is extended or adjusted under 35 U.S.C. 154(b) by 218 days.

(21) Appl. No.: 10/787,518

(22) Filed: Feb. 26, 2004

(65) Prior Publication Data

US 2005/0110472 A1    May 26, 2005

Related U.S. Application Data

(60) Provisional application No. 60/524,952, filed on Nov. 25, 2003.

(51) Int. Cl.
    *G05F 1/59*    (2006.01)
(52) U.S. Cl. .................. 323/272; 323/299; 363/41; 363/65
(58) Field of Classification Search ................ 323/268, 323/269, 271, 272, 299; 363/21.1, 21.11, 363/21.18, 26, 41, 65, 95
See application file for complete search history.

(56) References Cited

U.S. PATENT DOCUMENTS

| | | | |
|---|---|---|---|
| 6,144,194 A * | 11/2000 | Varga | 323/285 |
| 6,278,263 B1 * | 8/2001 | Walters et al. | 323/272 |
| 6,285,571 B1 * | 9/2001 | Brooks et al. | 363/65 |
| 6,362,608 B1 * | 3/2002 | Ashburn et al. | 323/272 |
| 6,515,460 B1 * | 2/2003 | Farrenkopf | 323/272 |
| 6,593,724 B1 * | 7/2003 | Chen | 323/283 |
| 6,605,931 B1 * | 8/2003 | Brooks | 323/272 |
| 6,791,304 B1 * | 9/2004 | Pearce et al. | 323/283 |
| 6,836,103 B1 * | 12/2004 | Brooks et al. | 323/282 |
| 6,894,464 B1 * | 5/2005 | Zhang | 323/268 |
| 6,903,537 B1 * | 6/2005 | Tzeng et al. | 323/268 |
| 6,977,489 B1 * | 12/2005 | Isham | 323/272 |
| 6,995,548 B1 * | 2/2006 | Walters et al. | 323/272 |

* cited by examiner

*Primary Examiner*—Jeffrey Sterrett
(74) *Attorney, Agent, or Firm*—Gary R. Stanford

(57) ABSTRACT

A PWM system that minimizes output ripple of a multiphase DC-DC converter which converts N input voltages including at least one dissimilar input voltage. The PWM system includes PWM waveform logic that generates N PWM signals including a PWM signal for each of the N input voltages, and PWM control logic that optimizes relative phases of the N PWM signals based on voltage levels of the N input voltages. Various circuits and/or methods are contemplated for optimizing phase, including, for example, centering pulses for each PWM cycle, distributing pulses based on predetermined optimal phase angles, determining input voltage levels and selecting predetermined optimal phase angles, generating phase signals employing predetermined phase angles, measuring input voltages and calculating optimal phase angles, and using PLL logic or the like to measure and equalize off-times between PWM pulses.

30 Claims, 8 Drawing Sheets

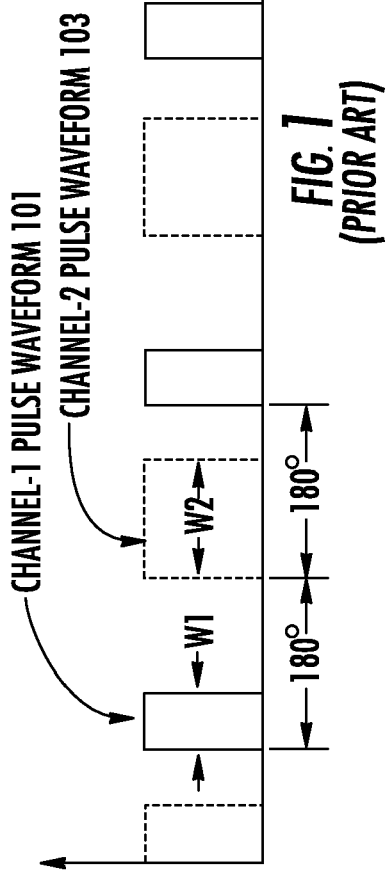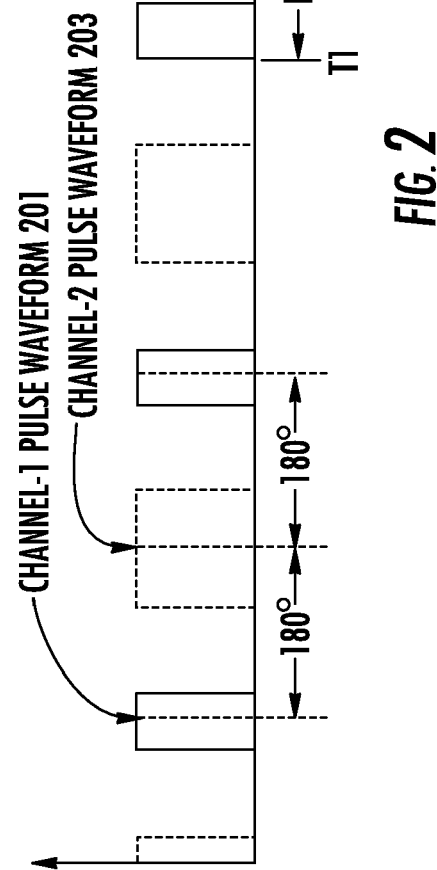

MULTIPHASE DC-DC CONVERTER WITH REDUCED RIPPLE

CROSS-REFERENCE TO RELATED APPLICATIONS

This application claims the benefit of U.S. Provisional Application No. 60/524,952, filed on Nov. 25, 2003, which is herein incorporated by reference for all intents and purposes.

BACKGROUND OF THE INVENTION

1. Field of the Invention

The present invention relates to multiphase DC-DC converters, and more particularly to determining optimal phase relationship between channels to reduce ripple.

2. Description of the Related Art

An AC-to-DC converter delivers power to a computer motherboard by way of distinct DC sources, such as, for example, consisting of a 12 Volt (V) source, a 5V source, and a 3.3V source. The current available from each of the DC sources is limited so that devices on the computer motherboard must adhere to a system power budget that limits the current drawn from each of the DC sources. Many devices on the motherboard use point-of-load DC-to-DC (or DC-DC) regulators to convert input voltages consisting of one or more of the DC sources to the precise output voltage required by the load device. The point-of-load DC-DC regulator must limit the current drawn from each of the DC sources so as not to exceed the capacity of any of the DC sources. If the power requirement of the device is such that it cannot be solely supplied by any one of the available DC sources, the point-of-load regulator must derive its power from a combination of the available DC sources.

One example is a graphics adapter card using a point-of-load regulator to convert both 12V and 3.3V to an output voltage regulated to a precise level below 3.3V, such as a voltage range of 1V to 2.5V (e.g., 1.25V). The precise level is necessary to properly supply the graphics processor.

Multi-phase DC-DC converters are commonly used as point-of-load regulators when single-phase converters are insufficient. A single-phase converter may be insufficient due either to physical or economic limitations. One of the economic benefits afforded by multi-phase DC-DC converters is reduction in voltage ripple on the output. In conventional designs, each channel is operated symmetrically out of phase with the other channels. Out of phase currents from each channel combine additively to result in ripple current with lower amplitude and higher frequency. Lower-amplitude and higher-frequency ripple currents require less filtering to produce an acceptable level of output-voltage ripple. The smoothing filter consists of fewer or lower-quality capacitors resulting in reduced cost, size, or both.

The present state of the art in multiphase power converter produces out-of-phase channel currents by staggering the operation of each channel by an angle related to the number of channels, N. In particular, each channel is operated 360°/N after the previously operated channel and 360°/N before the subsequently operated channel. This arrangement is optimal for ripple cancellation in multi-phase DC-DC converters in which each channel is powered from the same input voltage (e.g., when VIN is the same for all channels). When different channels have different input voltages, however, the optimal phase relationship between the operation of the channels is not 360°/N. Conventional methods make no attempt to implement an optimal phase relationship between multiphase converters having different input voltages.

SUMMARY OF THE INVENTION

A pulse-width modulation (PWM) system according to an embodiment of the present invention minimizes output ripple of a multiphase DC-DC converter which converts N input voltages including at least one dissimilar input voltage. The PWM system includes PWM waveform logic that generates N PWM signals including a PWM signal for each of the N input voltages, and PWM control logic that optimizes relative phases of the N PWM signals based on voltage levels of the N input voltages.

In one embodiment, the PWM control logic centers pulses of the N PWM signals for each PWM cycle. In another embodiment, the PWM control logic distributes pulses of the N PWM signals based on predetermined phase angles including at least one phase angle other than 360/N degrees. In various embodiments, the PWM control logic includes conversion logic that determines input voltage levels and select logic that selects at least one of multiple predetermined phase angles. In one case, the conversion logic includes an analog to digital converter (ADC) that determines the input voltage levels from among multiple predetermined voltage levels and the select logic includes a lookup table or the like that stores multiple predetermined phase values. In another case, the PWM control logic includes digital logic that generates multiple phase signals each having a phase angle associated with a combination of the predetermined voltage levels, and phase select logic that selects from among the phase signals. In a more specific embodiment, an ADC generates digital values, and the phase select logic includes a decoder that converts the digital values to corresponding select signals and a multiplexer that selects from among the phase signals based on the select signals.

In other embodiments, the PWM control logic includes conversion logic that measures input voltage levels and computation logic that calculates at least one optimal phase angle based on measured input voltage levels. Alternatively, the PWM control logic includes phase-locked loop (PLL) logic that measures and equalizes off-times between consecutive pulses of the PWM signals.

A DC-DC converter according to an embodiment of the present invention includes multiple channels and PWM logic. Each channel receives a corresponding input voltage, where at least one of the input voltages is different. The channels collectively develop an output voltage each using a corresponding one of multiple PWM signals. The PWM logic generates the PWM signals with optimized phase angles to minimize output ripple. Various embodiments of the PWM logic are contemplated for optimizing phase angle, including PLL logic or the like for measuring and equalizing off-times between consecutive pulses of the PWM signals, logic for shifting one PWM signal by a predetermined phase angle, conversion logic that determines input voltage levels and select logic that determines at least one corresponding phase angle based on input voltage levels, digital logic that generates multiple phase signals based on a master clock signal and associated with combinations of predetermined input voltage levels, etc.

A method of reducing ripple of a multiphase DC-DC converter that converts N input voltages including at least one dissimilar input voltage includes generating N PWM waveforms each corresponding to one of the N input voltages, and adjusting phase of at least one of the PWM waveforms to achieve an optimal phase relationship in which at least one pulse is initiated at a phase angle other than 360/N degrees during each PWM cycle. The adjusting phase may include centering PWM pulses relative to each other. The method may further include measuring off-times between consecutive PWM pulses and equalizing measured off-times. The measuring and equalizing may include employing a phase-locked loop circuit. The method may include determining input voltage levels, determining at least one optimal phase angle based on determined input voltage levels, and adjusting phase of at least one PWM waveform based on the at least one optimal phase angle. The method may include selecting from among predetermined voltage levels, reading phase values from a memory device, generating multiple phase signals and selecting a phase signal based on selected voltage levels, measuring input voltage levels and calculating optimal phase value(s) based on measured input voltage levels, etc.

BRIEF DESCRIPTION OF THE DRAWINGS

The benefits, features, and advantages of the present invention will become better understood with regard to the following description, and accompanying drawings where:

FIG. 1 is a timing diagram illustrating the conventional phase relationship or phase sequencing for a conventional two-phase power converter;

FIG. 2 is a timing diagram illustrating the optimal phase sequencing for a two-phase power converter implemented according to an embodiment of the present invention;

DETAILED DESCRIPTION

Figure 3:
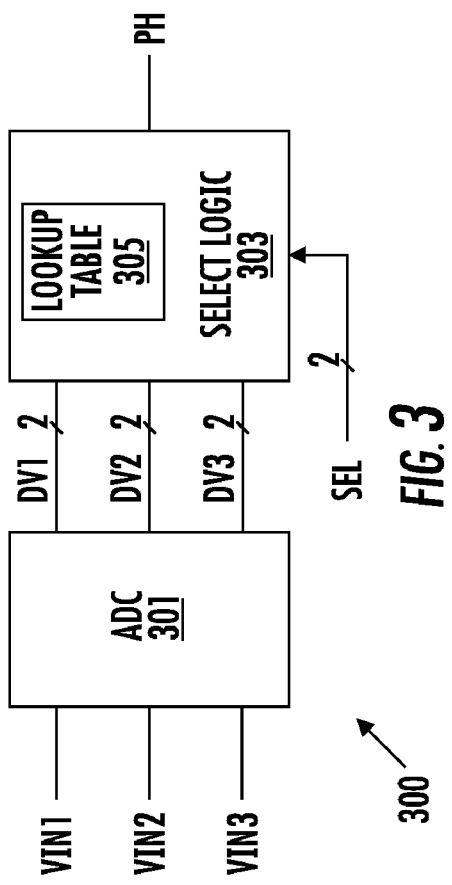
FIG. 3 is a simplified block diagram of phase selection logic used to select a predetermined phase value PH for a selected two of three input voltages VIN1, VIN2 and VIN3 for a known output voltage.

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

FIG. 1 is a timing diagram illustrating the conventional phase relationship or phase sequencing for a conventional two-phase power converter (not shown). In this case, the number "N" of phases or channels is 2 so that there is a channel-1 pulse-width modulation (PWM) waveform shown as solid-line pulses 101 and a channel-2 PWM waveform shown as dashed-line pulses 103. According to the conventional converter design, the channels 1 and 2 are 180 degrees (°) out-of-phase with respect to each other so that each pulse 103 of channel-2 begins 180° after the beginning the prior pulse 101 of channel-1 and vice-versa. This phase relationship would otherwise be optimal if the input voltages were the same for both channels.

The pulses 103 of channel-2, however, have a greater duration than the pulses 101 of channel-1. As shown, the pulses 101 have a duration or width of approximately W1 whereas the pulses 103 have a width W2, where W2>W1. The differences in the pulse widths between the channels is a consequence of the input voltages, where the input voltage for channel-2 is less than the input voltage for channel-1 so that the pulse width for channel 2 is greater. It has been determined that the combined output ripple for the conventional converter implemented using 360/N phase relationships for the start times of the PWM waveforms is not optimal.

Figure 10:
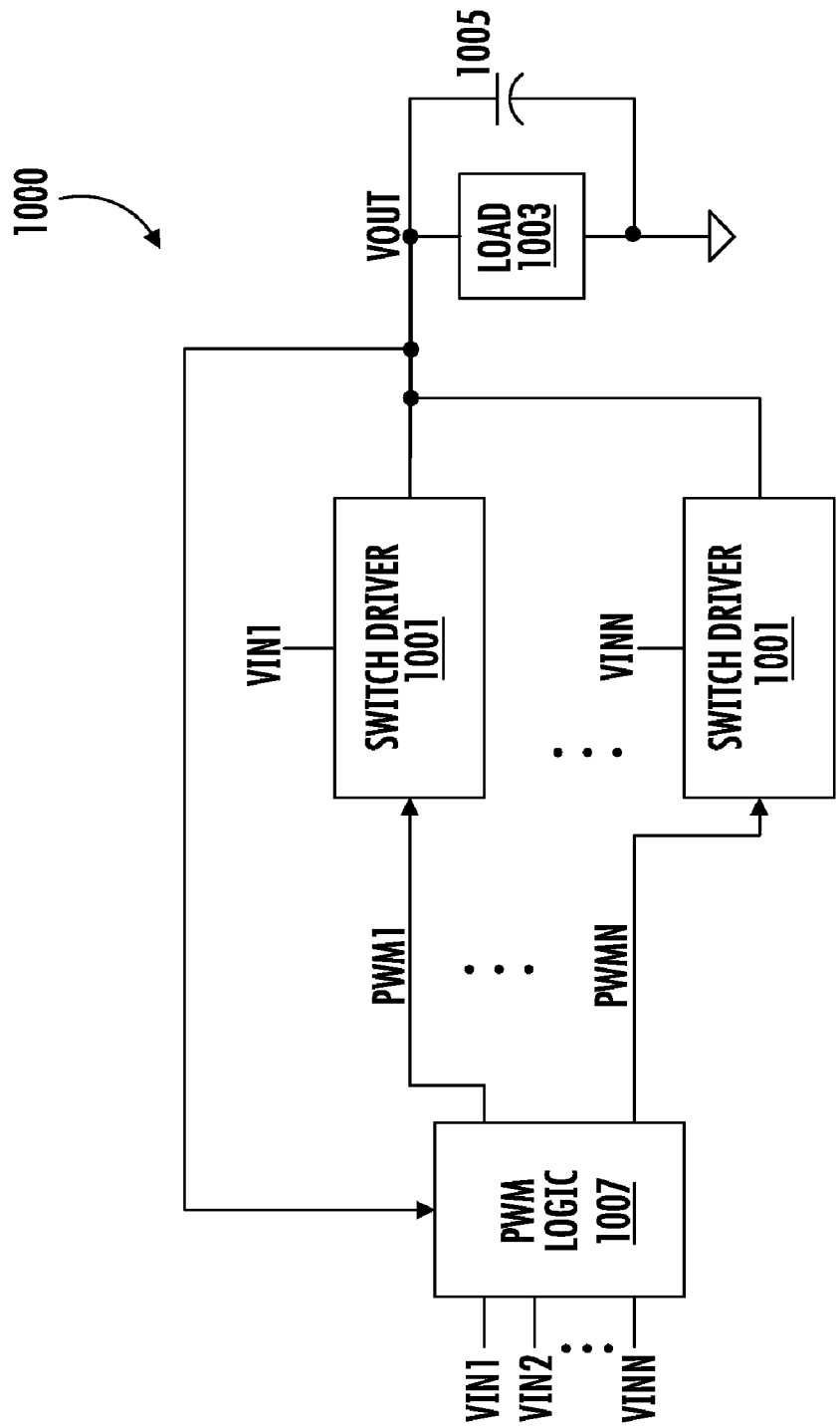
FIG. 10 is a simplified block diagram of a multiphase DC-DC converter implemented according to an exemplary embodiment of the present invention.

FIG. 2 is a timing diagram illustrating the optimal phase sequencing for a two-phase power converter implemented according to an embodiment of the present invention (see, e.g., the converter 1000 of FIG. 10 implemented with two channels). Again, the channel-1 PWM waveform is shown as solid-line pulses 201 and the channel-2 PWM waveform is shown as dashed-line pulses 203. As shown, the optimal phase relationship occurs when the pulses 201 from channel-1 occur approximately in the center between the pulses 203 of channel-2 and vice-versa. Each Channel-2 waveform pulse 203 is centered between consecutive pulses 203 of the Channel-1 waveform and vice-versa, resulting in a 180° phase relationship between the centers of the pulses 201, 203. Note a pulse 203 of channel-2 beginning at time T2 has a first phase PH1 relative to a prior pulse 201 of channel-1 beginning at time T1, and the next pulse 201 of channel-1 beginning at time T3 has a second phase PH2 relative to the pulse 201 beginning at time T2, where PH1 is not the same and significantly less than PH2. It can easily be shown that the combined output ripple current for a converter implemented according to the present invention generating the pulses 201, 203 is significantly smaller than the combined output ripple current for the conventional converter generating the pulses 101, 103.

One method to ensure that the "on" pulse from one channel occurs squarely in the center of the "off" pulse of the other channel relies on prior knowledge of the relative pulse widths. For example, if the converter only has to support input voltages of 12V on channel 1, 3.3V on channel 2, and a 2.5V output, the optimal phase angle from channel 1 to channel 2 is 81.14°. In this case, a converter with input voltages 12V and 3.3V and an output voltage of 3.3V employing a phase relationship of approximately 80° start time phases has significantly less ripple than a conventional converter that maintains the standard 180° phase relationship. In general, for any combination of VIN1, VIN2, and VOUT, there is a corresponding optimal phase angle "θ" determined according to the following equation 1:

$$\theta = 180°\left(1 + \frac{V_{OUT}}{V_{IN1}} - \frac{V_{OUT}}{V_{IN2}}\right) \quad (1)$$

where VIN1 and VIN2 may be swapped without effecting the phase relationship.

Several implementation variations are possible and contemplated. For a finite number of combinations of known input and output voltage levels, a finite number of corresponding angles are designed into the converter. Such angles are predetermined and stored, such as in a lookup table or the like, and the appropriate angle is selected based on the applicable input voltages. If only two known input voltages are provided, then the optimal phase angle is predetermined and built into the converter to achieve the optimal phase and minimal ripple. If three or more known input voltages are contemplated, then selection logic or the like is used to select pre-stored phase values. If the voltage levels are not exactly known, then conversion and computation logic is employed to identify voltage levels and determine phase angle. Three or more channels and corresponding phases are contemplated, in which the relative phases between the channels are adjusted to achieve optimal performance and minimum output ripple.

FIG. 3 is a simplified block diagram of phase selection logic 300 used to select a predetermined phase value PH for a selected two of three input voltages VIN1, VIN2 and VIN3 for a known output voltage. The input voltages VIN1, VIN2 and VIN3 are provided to a simple analog-to-digital converter (ADC) 301, which outputs corresponding 2-bit digital values DV1, DV2 and DV3. The DV1–DV3 values are not necessarily converted with sufficient resolution to accurately measure specific voltage levels, but instead include a sufficient number of discrete levels to distinguish between the known input voltage levels. For example, if the input voltages are selected from among voltages 3.3V, 5V and 12V, then the binary DV values may be 01, 10 and 11, respectively.

The DV1–DV3 digital values are provided to select logic 303, which receives a digital select input signal SEL to select between any two input voltages. The SEL value is generated by other logic (not shown) of the converter to select from among the voltage inputs based on various factors, such as load, voltage availability, etc. The selected DV values are applied to a memory 305, such as a lookup table (LUT) or the like within the select logic 303, which outputs the corresponding phase value PH. Note that any combination of the known voltage levels (e.g., 3.3V, 5V, 12V, etc.) may be applied as the input voltage signals VIN1–VIN3, so that, for example, VIN1 may be 5V and VIN2 3.3V, and vice-versa. The DV values identify the voltage levels, the SEL value selects from among the DV values, and the memory 305 selects the appropriate phase. In this case, at least four different phase values are stored, including a first phase value for the combination VIN1 and VIN2, a second phase for the combination VIN1 and VIN3, a third phase value for the combination VIN2 and VIN3, and a phase value corresponding to 180 degrees in the event the voltage levels of the selected inputs are equal.

Figure 4:
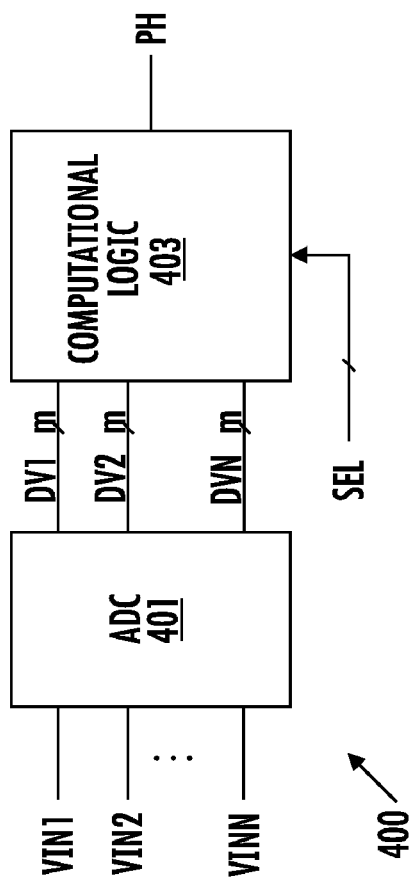
FIG. 4 is a simplified block diagram of phase selection logic used to determine the phase value PH for a selected two of N input voltages VIN1, VIN2, . . . , VINN for a known output voltage.

FIG. 4 is a simplified block diagram of phase selection logic 400 used to determine the phase value PH for a selected two of N input voltages VIN1, VIN2, . . . , VINN for a known output voltage. In this case, the specific voltage levels of the input voltages are not necessarily known, even if they are within a predetermined and known range of voltages. The VIN1–VINN signals are provided to respective inputs of an ADC 401, which outputs corresponding digital values DV1, DV2, . . . , DVN to computation logic 403, which outputs a selected phase value PH. The ADC 401 has sufficient resolution to more accurately measure the particular voltage levels of the input voltages VIN1–VINN, where each of the DV1–DVN values have "m" bits. The number "m" is selected to achieve the desired resolution of voltage measurement. The computation logic 403 receives a select signal SEL, which selects any two of the DV1–DVN values in a similar manner as previously described. The computation logic 403 determines the appropriate phase angle based on the selected DV values, such as performing a calculation according to equation 1 as previously described, and outputs the selected phase as the PH value.

Figure 5:
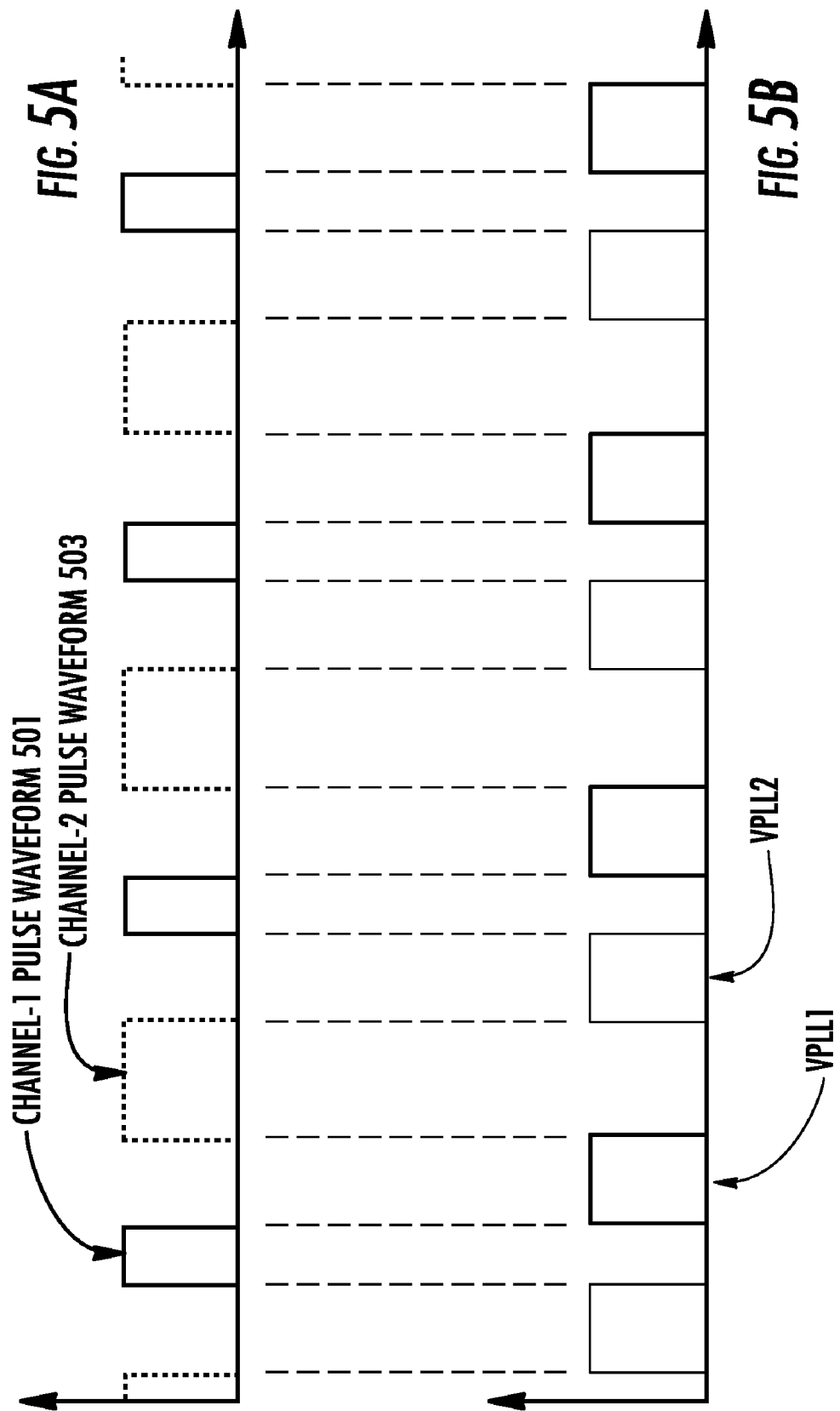
FIGS. 5A and 5B are timing diagrams illustrating a phase-locked loop (PLL) method for adjusting phase angle according to an exemplary embodiment of the present invention.

FIGS. 5A and 5B are timing diagrams illustrating a phase-locked loop (PLL) method for adjusting phase angle according to an exemplary embodiment of the present invention. In FIG. 5A, the channel-1 PWM waveform is shown as solid-line pulses 501 and the channel-2 PWM waveform is shown as dashed-line pulses 503. The logic at the input to the PLL creates two pulses VPLL1 and VPLL2 as shown in FIG. 5B, where signal edges are projected from FIG. 5A. The VPLL1 pulse is asserted high when the channel-1 pulse goes low and is asserted low when the channel-2 pulse goes high. In a similar manner, the VPLL2 pulse is asserted high when the channel-2 pulse goes low and is asserted low when the channel-1 pulse next goes high. Using a voltage proportional to the width of VPLL1 as a reference, and a voltage proportional to the width of VPPL2 for feedback, the PLL logic adjusts voltage proportional to the width of VPLL2 until it is equal to the voltage proportional to the width of VPLL1. The PLL logic ensures equal spacing between the pulses 501 and 503, which corresponds to the optimal phase sequence.

Figure 6:
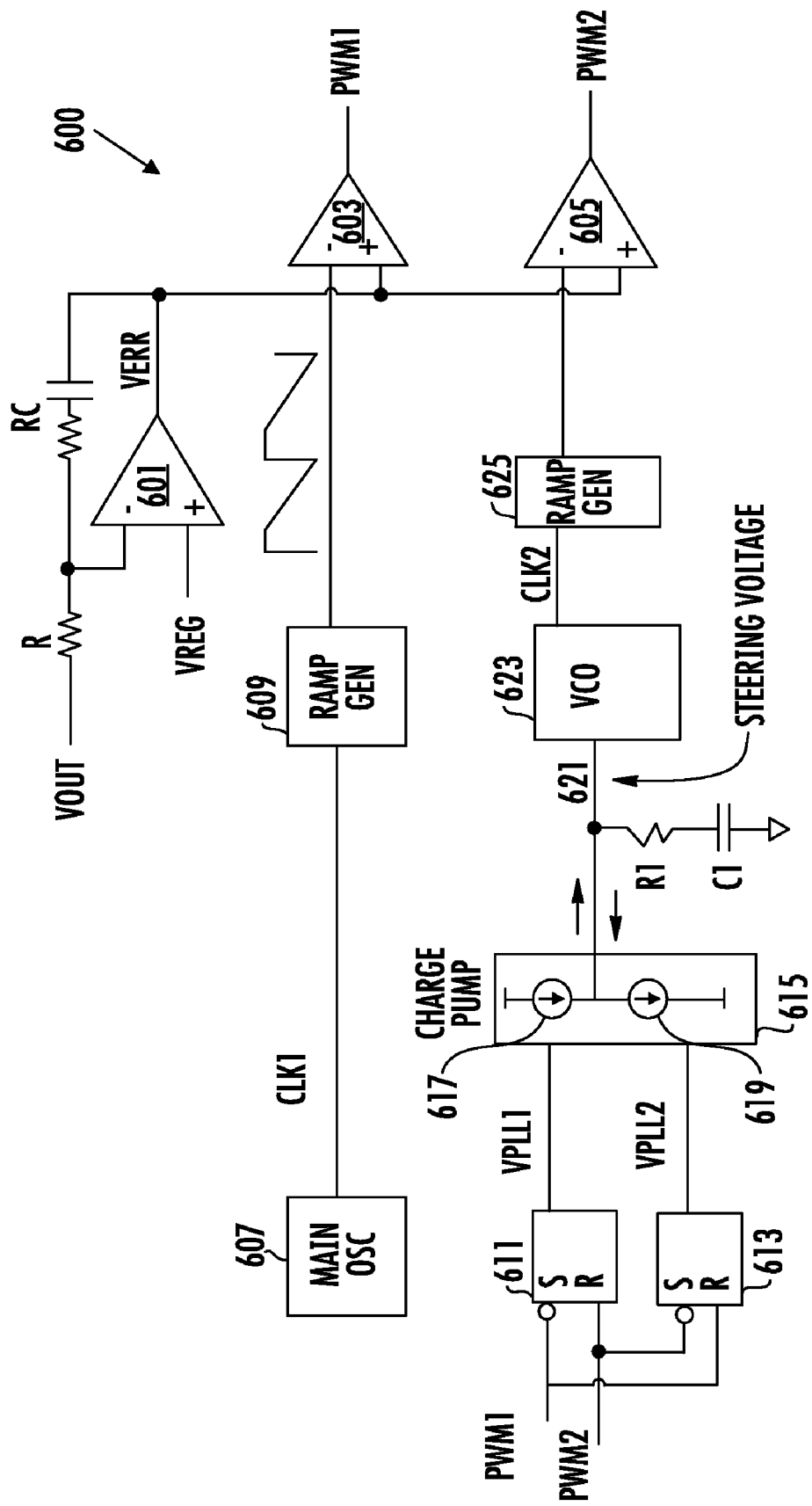
FIG. 6 is a simplified schematic and block diagram of a portion of a converter including PLL logic implemented according to one exemplary embodiment of the present invention.

FIG. 6 is a simplified schematic and block diagram of a portion of a converter 600 including PLL logic implemented according to one exemplary embodiment of the present invention. The output signal VOUT is applied through a feedback resistor R to the inverting input of an error amplifier 601, where the inverting input is coupled through an RC compensation circuit to the output of the error amplifier 601. The non-inverting input of the error amplifier 601 receives a regulation voltage VREG, and the error amplifier 601 asserts an error voltage VERR at its output. The VERR signal is provided to the non-inverting input of each of a pair of comparators 603 and 605.

The first channel includes a main oscillator 607, which generates a first clock signal CLK1 provided to a ramp generator 609, which generates a sawtooth or ramp signal RAMP1. The RAMP1 signal is provided to the inverting input of the comparator 603, which generates a first PWM waveform PWM1 at its output for the first channel or phase. The comparator 605 generates a second PWM waveform PWM2 at its output for the second channel or phase. The second channel includes first and second SR latches 611, 613, each having an inverted set input "S" and a reset input R. The PWM1 signal is provided to the set input of SR latch 611 and to the reset input of SR latch 613, and the PWM2 signal is provided to the reset input of SR latch 611 and to the set input of SR latch 613. The SR latch 611 generates a signal VPLL1 provided to a first input of a charge pump 615 and the SR latch 613 generates a signal VPLL2 provided to a second input of the charge pump 615. The charge pump 615 includes a current source 617 and a current sink 619, both coupled to a node 621. The current source 617 sources current to node 621 when the VPLL1 signal is asserted high and the current sink 619 sinks current from the node 621 when the VPLL2 signal is asserted high.

The node 621 is coupled to one end of a resistor R1 and to the input of a voltage-controlled oscillator 623. The other end of the resistor R1 is coupled to one end of a capacitor C1, having its other end coupled to ground. The VCO 623 generates a second clock signal CLK2 based on the voltage of node 621, where the CLK2 signal is provided to a second ramp generator 625. The ramp generator 625 generates a second ramp signal RAMP2, which is provided to the inverting input of the comparator 605. The RAMP2 signal has a similar shape and frequency as the RAMP1 signal, except is adjusted based on the steering voltage on node 621. For purposes of illustration, the PWM1 signal is assumed to have the form of the pulses 501 and the PWM2 signal is assumed to have the form of the pulses 503 shown in FIG. 5A. In this manner, the VPLL1 and VPLL2 signals are represented in the timing diagram of FIG. 5B.

In operation, when the VPLL1 signal is asserted high, the current source 617 is activated to charge the capacitor C1 to raise the voltage of node 621. When the VPLL2 signal is asserted high, the current sink 619 is activated to draw current from capacitor C1 to lower the voltage of node 621. If the width or duration of VPLL1 is greater than VPLL2, then the charging time is greater than the discharge time of the capacitor C1 and the VCO 623 increases the frequency of the CLK2 signal. Increasing the frequency of the CLK2 signal decreases the width of VPLL1 and increases the width of VPLL2. On the other hand, if VPLL1 is less than VPLL2, then the frequency of the CLK2 signal is reduced thereby increasing the width of VPLL1 and decreasing the width of VPLL2. The voltage of the node 621 operates as a steering voltage controlling the VCO 623, which operates in the feedback loop to equalize VPLL2 with VPLL1. When the VPLL1 and VPLL2 pulses are equalized, then the pulses of the PWM1 and PWM2 signals are centered with respect to each other thereby minimizing the ripple on VOUT. The PLL logic can be generalized for additional phases and channels (e.g., for three or more PWM signals PWM1, PWM2, . . . , PWMN as shown for the converter 1000 of FIG. 10).

Figure 7:
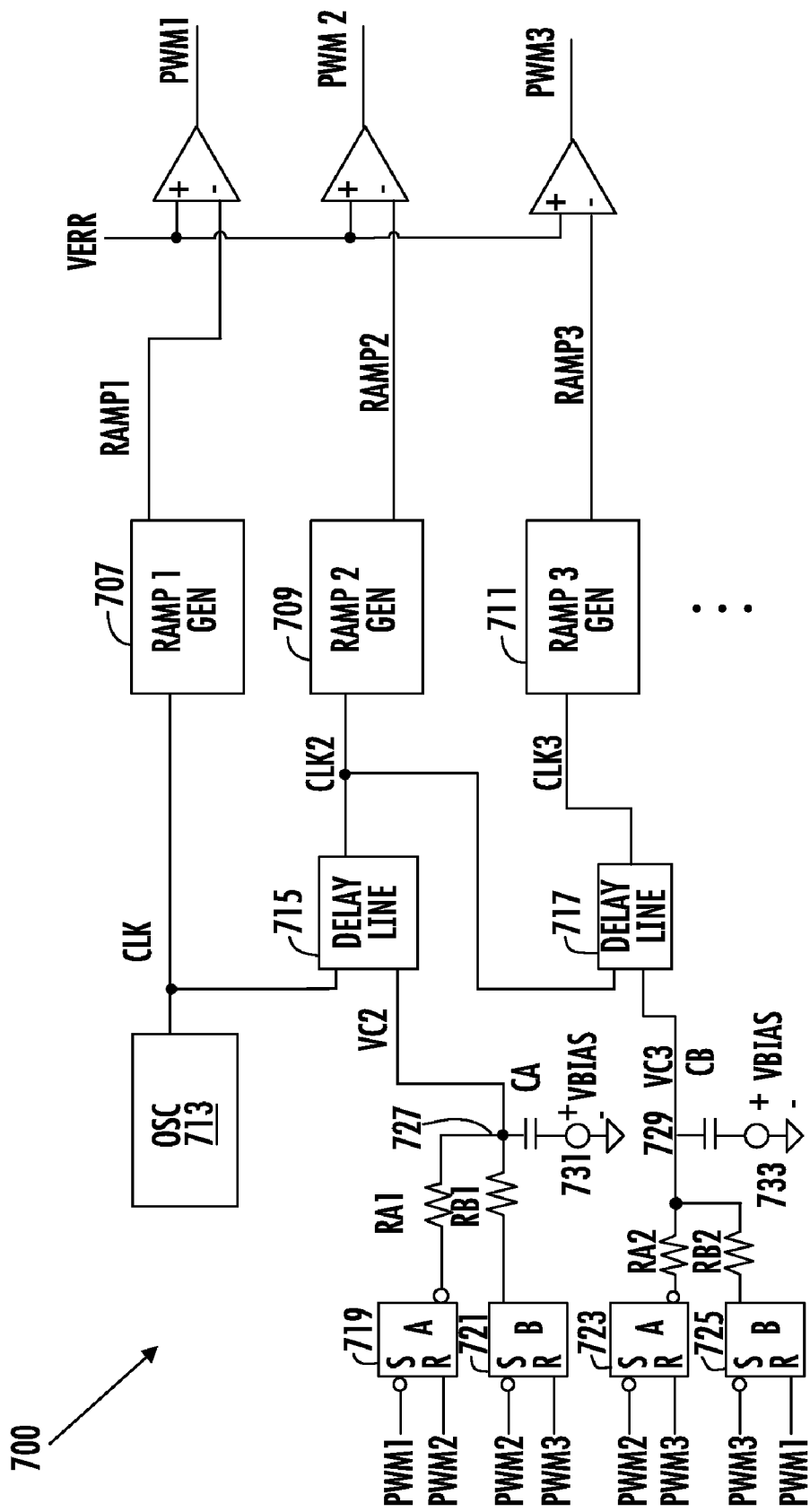
FIG. 7 is a simplified schematic and block diagram of a portion of a three phase converter including PLL logic implemented according to another exemplary embodiment of the present invention.

FIG. 7 is a simplified schematic and block diagram of a portion of a three phase converter 700 including PLL logic implemented according to another exemplary embodiment of the present invention. The VERR signal from the error amplifier 601 is provided to the non-inverting inputs of three comparators 701, 703 and 705 having outputs providing PWM waveforms PWM1, PWM2 and PWM3, respectively. A first ramp generator 707 receives a clock signal CLK and generates a first ramp signal RAMP1 provided to the inverting input of the comparator 701. A second ramp generator 709 receives a clock signal CLK2 and generates a second ramp signal RAMP2 provided to the inverting input of the comparator 703. A third ramp generator 711 receives a clock signal CLK3 and generates a third ramp signal RAMP3 provided to the inverting input of the comparator 705. The CLK signal is generated by an oscillator 713 and provided to the input of a first delay block 715, which outputs the CLK2 signal. The CLK2 signal is provided to the input of a second delay block 717, which outputs the CLK3 signal. A signal VC2 is provided to another input of the delay block 715, where the amount of delay through delay block 715 is based on the voltage level of VC2. In a similar manner, a signal VC3 is provided to another input of the delay block 717, where the amount of delay through delay block 717 is based on the voltage level of VC3. The delay blocks 715 and 717 may each be implemented as a sequential series of inverters (not shown) or the like having a relative speed based on the steering voltages VC2 and VC3, respectively.

A set of four SR latches 719, 721, 723 and 725 are provided, each having an inverted set input "S" and a reset input R. The PWM1 signal is provided to the set input of SR latch 719 and to the reset input of SR latch 725. The PWM2 signal is provided to the reset input of SR latch 719 and to the set inputs of SR latches 721 and 723. The PWM3 signal is provided to the reset inputs of SR latches 721 and 723 and to the set input of SR latch 725. The SR latch 719 has an inverting output provided through a resistor RA1 to a node 727, which develops the VC2 signal. When the SR latch 719 is reset, its inverting output goes low and when set, its inverting output is tri-stated. The SR latch 721 has a non-inverting output provided through a resistor RB1 to the node 727. When the SR latch 721 is set, its non-inverting output goes high and when reset, its non-inverting output is tri-stated. The SR latch 723 has an inverting output provided through a resistor RA2 to a node 729, which develops the VC3 signal. When the SR latch 723 is reset, its inverting output goes low and when set, its inverting output is tri-stated. The SR latch 725 has a non-inverting output provided through a resistor RB2 to the node 729. When the SR latch 725 is set, its non-inverting output goes high and when reset, its non-inverting output is tri-stated.

A bias voltage source 731 generates a bias voltage VBIAS to one end of a capacitor CA, having its other end coupled to node 727, and another bias voltage source 733 generates the bias voltage VBIAS to one end of another capacitor CB, having its other end coupled to node 729. The voltage of VC2 at node 727 is VBIAS plus the voltage across the capacitor CA and the voltage of VC3 at node 729 is VBIAS plus the voltage across the capacitor CB.

In operation, the VBIAS voltage is set for an initial phase sequence of 360°/N for N=3 phases or 120°. Thus, initially, PWM2 starts 120° out of phase relative to PWM1 and PWM3 starts 120° out of phase relative to PWM2. The SR latch 719 discharges capacitor CA from when PWM1 goes low to when PWM2 goes high (i.e., VPLL1) and the SR latch 721 charges the capacitor CA from when PWM2 goes low to when PWM3 goes high (i.e., VPLL2). Otherwise, the outputs of the SR latches 719, 721 are tri-stated. In this manner, the SR latches 719 and 721 charge the capacitor CA to set the voltage level of VC2 to delay the start time of PWM2 relative to PWM1 to equalize the off time between PWM1 and PWM2 (VPLL1) with the off time between PWM2 and PWM3 (VPLL2). In a similar manner, the SR latch 723 discharges capacitor CB from when PWM2 goes low to when PWM3 goes high (i.e., VPLL2) and the SR latch 725 charges the capacitor CB from when PWM3 goes low to when PWM1 goes high (i.e., VPLL3). Otherwise, the outputs of the SR latches 723, 725 are tri-stated. In this manner, the SR latches 723 and 725 charge the capacitor CB to set the voltage level of VC3 to delay the start time of PWM3 relative to PWM2 to equalize the off time between PWM2 and PWM3 (VPLL2) with the off time between PWM3 and PWM1 (VPLL3).

It is appreciated that the converter 700 centers the PWM2 pulses between consecutive ones of the PWM1 and PWM3 pulses and centers the PWM3 pulses between consecutive ones of the PWM2 and PWM1 pulses to optimize phase and minimize ripple for all three phases. For example, if the pulse width of PWM2 is larger than the pulse width of PWM1, then the PWM2 is initiated earlier than 120° every cycle. The circuit may be generalized for any number of phases in which each pulse of a given phase is centered between the pulses of the immediate prior and the immediate subsequent channels.

The methods described above assume that the converter/regulator uses a sawtooth waveform or the like at the PWM comparator using the single-edge modulation technique. With single-edge modulation, one edge of the pulse is clocked (e.g., initial edge) while the other edge is modulated to vary pulse width as necessary to achieve the desired output voltage. In an alternative embodiment, dual edge modulation (not shown) is contemplated. With dual-edge modulation, a symmetrical triangular waveform for the PWM comparator is employed such that both edges of the pulse are modulated equally to achieve the desired output voltage. The vertices of the triangle waveforms are clocked, and each pulse is symmetrical about the vertex. Provided that the centers of the vertices are distributed symmetrically every 360°/N apart, the condition that the centers of the pulses from each of the N phases are centered 360°/N apart is met.

Figure 8:
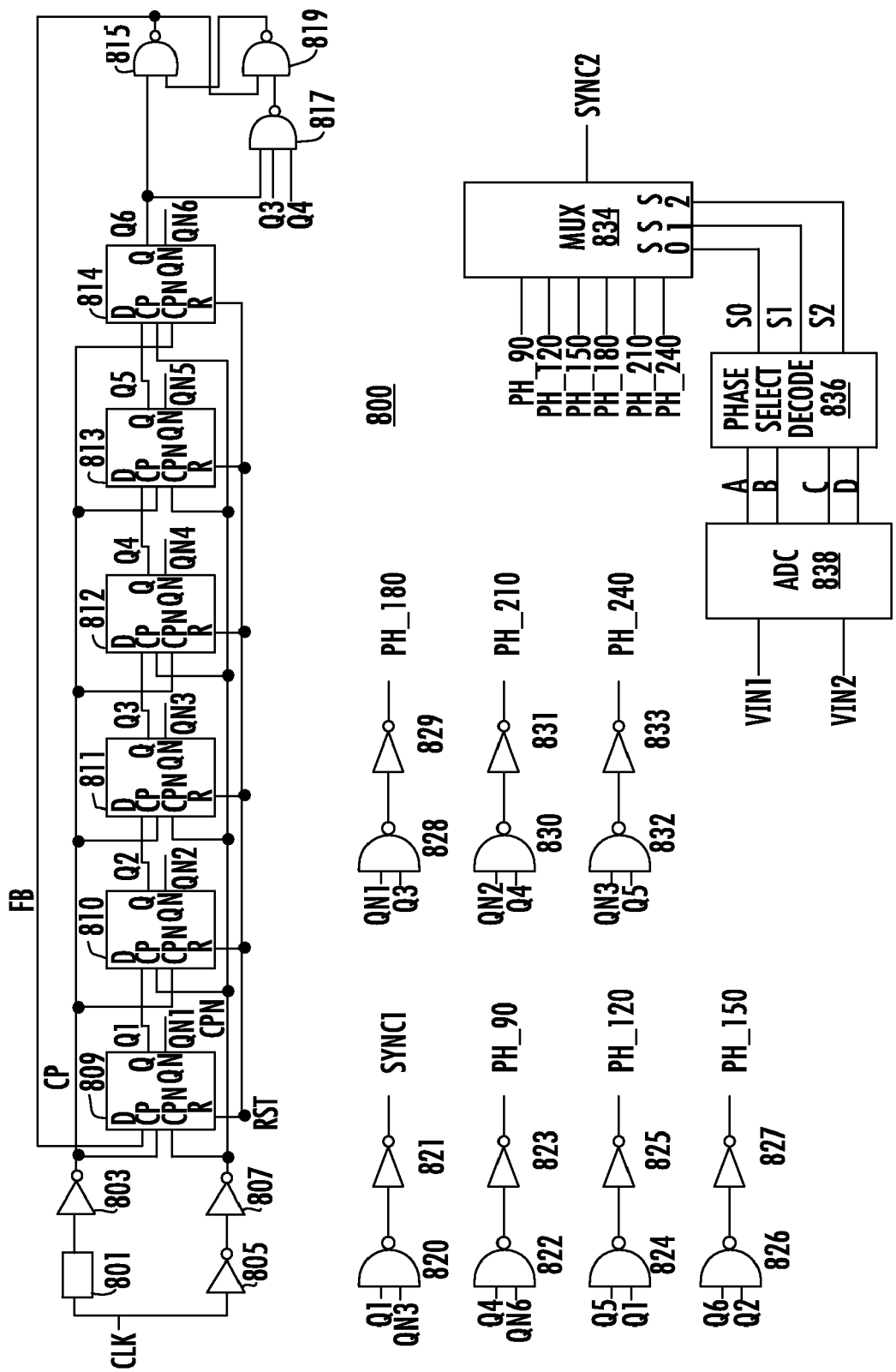
FIG. 8 is a schematic diagram of a digital logic system for adjusting phase angle according to another exemplary embodiment of the present invention.

FIG. 8 is a schematic diagram of a digital logic system 800 for adjusting phase angle according to another exemplary embodiment of the present invention. The digital logic system 800 is implemented using the first method described above in which the input and output voltages are known and where the corresponding phase angles are pre-calculated, such as employing equation 1. A master clock signal CLK is divided a sufficient number of times to achieve a clock edge corresponding to an optimal phase relationship for each combination of input voltages. In one particular case, the input voltages VIN1 and VIN2 are selected from 3 voltages 12V, 5V and 3.3V, and a nominal output voltage of 1.25V is assumed. Graphics card applications, for example, have these voltage supply voltages available and any two of the 3 available voltages are used to provide optimal phase relationships for a two-phase integrated controller. If VIN1=VIN2, the phase is 180°. If VIN1=12V and VIN2=5V or if VIN1=5V and VIN2=3.3V, then the phase is 210°. If VIN1=12V and VIN2=3.3V, then the phase is 240°. For each case, VIN1 and VIN2 may be swapped without changing the phase relationship.

The digital logic system 800 illustrates a 6× system clock CLK and digital logic operating on both edges of the clock. A string D-type flip-flops (DFFs) 809, 81, 811, 812, 813 and 814 are provided, in which every other DFF is clocked on opposite phases of clock signals CP/CPN (both based on the CLK signal) to generate 1 clock wide output timing pulses of the correct phase relationship. By creating timing pulses for channel 1 and channel 2 that are 1 system clock wide, digital logic is used to adjust the relationship of these timing pulses in 30 degree increments, i.e., since both clock edges are being used, the resolution is 360/12=30 (e.g., phases of 0, 30, 60, 90, 120, 150, 180, 210, 240, 270, 300, 330 and 360 etc.). Resistive dividers, voltage references and comparators are used to supply the logic signals to decode the VIN1 and VIN2 voltage levels into the above described phase relationships.

The CLK signal is provided to the input of a delay block 801 and to the input of an inverter 805. The output of the delay block 801 is provided to the input of an inverter 803, which outputs a clock signal CP (being a delayed and inverted version of CLK). The output of the inverter 805 is provided to the input of an inverter 807, which outputs a clock signal CPN (being a delayed version of CLK). The delays through inverters 803 and 807 are equal and the delay block 801 is set to equal the delay through inverter 805, so that CP and CPN are inverted versions of each other and precisely 180° out of phase with respect to each other. The CP signal is provided to the non-inverting clock input (CP) of DFFs 809, 811, and 813 and to the inverting clock input (CPN) of DFFs 810, 812, and 814. The CPN signal is provided to the CPN clock inputs of the DFFs 809, 811 and 813 and to the CP clock inputs of DFFs 810, 812 and 814. In this manner, each of the DFFs 809–814 are clocked at twice the frequency of the master CLK signal.

The D input of DFF 809 receives a feedback signal FB and provides signals Q1 and QN1 at its Q and QN outputs, respectively. The D input of DFF 810 receives the Q1 signal and provides signals Q2 and QN2 at its Q and QN outputs, respectively. The D input of DFF 811 receives the Q2 signal and provides signals Q3 and QN3 at its Q and QN outputs, respectively. The D input of DFF 812 receives the Q3 signal and provides signals Q4 and QN4 at its Q and QN outputs, respectively. The D input of DFF 813 receives the Q4 signal and provides signals Q5 and QN5 at its Q and QN outputs, respectively. The D input of DFF 814 receives the Q5 signal and provides signals Q6 and QN6 at its Q and QN outputs, respectively. The Q6 signal is provided to one input of a 2-input NAND gate 815 and to one input of a 3-input NAND gate 817. The other two inputs of the NAND gate 817 receive the Q3 and Q4 signals. The output of the NAND gate 817 is provided to one input of another 2-input NAND gate 819. The NAND gates 815 and 819 are cross-coupled so that the output of NAND gate 819 is coupled to the other input of the NAND gate 815 and the output of the NAND gate 815 is coupled to the other input of the NAND gate 819. The output of the NAND gate 815 generates the FB signal.

A set of 7 2-input NAND gates 820, 822, 824, 826, 828, 830 and 832 have outputs provided to a set of inverters 821, 823, 825, 827, 829, 831 and 833, respectively. The inputs of the NAND gate 820 receive the Q1 and QN3 signals and its corresponding inverter 821 outputs a synchronization signal SYNC1. The inputs of the NAND gate 822 receive the Q4 and QN6 signals and its corresponding inverter 823 outputs a phase signal PH_90. The inputs of the NAND gate 824 receive the Q5 and Q1 signals and its corresponding inverter 825 outputs a phase signal PH_120. The inputs of the NAND gate 826 inputs the Q6 and Q2 signals and its corresponding inverter 827 outputs a phase signal PH_150. The inputs of the NAND gate 828 receive the QN1 and Q3 signals and its corresponding inverter 829 outputs a phase signal PH_180. The inputs of the NAND gate 830 receive the QN2 and Q4 signals and its corresponding inverter 831 outputs a phase signal PH_210. The inputs of the NAND gate 832 receive the signals QN3 and Q5 and its corresponding inverter 833 outputs a phase signal PH_240.

A multiplexer (MUX) 834 selects from among the six phase signals PH_30–PH_240 (separated by 30 degrees) provided at corresponding inputs based on binary select signals S0, S1 and S2 and outputs the selected phase signal as a synchronization signal SYNC2. The select signal S0, S1 and S2 are generated by phase select decode (PSD) logic 836, which receives four binary signal A, B, C and D. The signals A and B form a 2-bit digital value generated by a simple ADC 838 based on a first input voltage VIN1 and the signals C and D form another 2-bit digital value generated by the ADC 838 based on a second input voltage VIN2. The input voltages VIN1 and VIN2 are each selected from the predetermined voltage levels 3.3V, 5V and 12V as previously described, so that the A/B and C/D digital values digitally distinguish between these known voltage levels (and yet do not need sufficient resolution to resolve the specific voltage levels). Based on the selected combination of input voltages (3.3V and 5V, or 3.3 and 12V, and 5V and 12V), the PSD logic 836 asserts the S0–S2 signals to enable the MUX 834 to select the appropriate one of the phase signals PH_90 to PH_240 as the SYNC2 signal for generating the known nominal output voltage of 1.25V.

Figure 9:
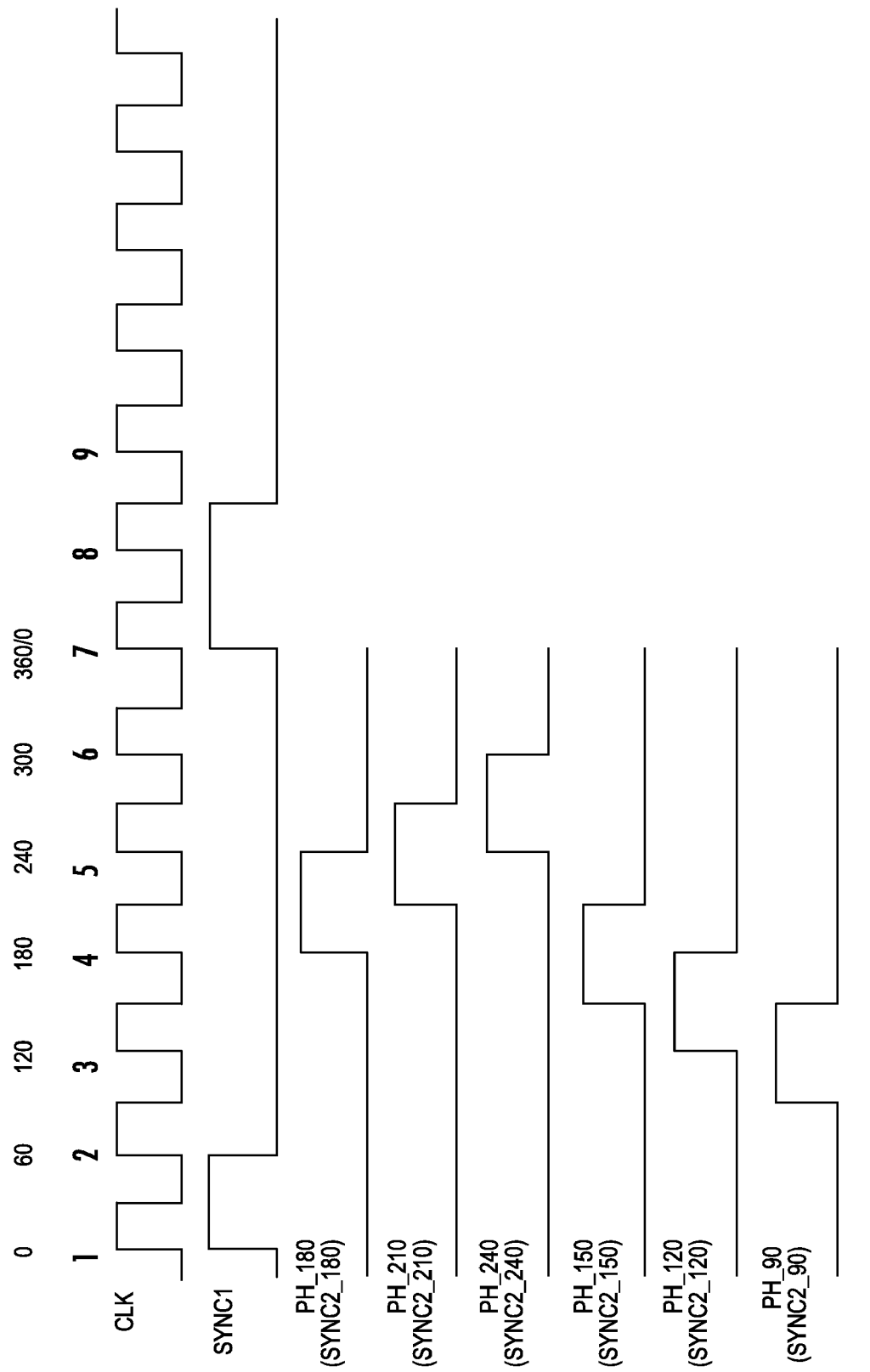
FIG. 9 is a timing diagram of the clock and synchronization signals of the digital logic system of FIG. 8.

FIG. 9 is a timing diagram of the clock and synchronization signals of the digital logic system 800. The CLK signal is plotted versus time along with the SYNC1 signal and the phase signals PH_90–PH_240. The SYNC2 signal is a selected one of the phase signals PH_90–PH_240 and is parenthetically shown as synchronization signals SYNC2_90–SYNC2_240, each associated with a corresponding one of the phase signals PH_90–PH_240 with the same phase angle. The ADC 838 converts the VIN1, VIN2 input signals to identify the input voltages, the PSD logic 836 outputs the S0–S2 signals to select the appropriate phase angle, and the MUX 834 selects from among the PH_90–PH_240 and outputs a selected one of the synchronization signals SYNC2_90–SYNC2_240 corresponding to the selected phase angle. The PWM1 signal of the converter synchronizes with the SYNC1 signal and the PWM2 signal of the converter synchronizes with the selected SYNC2 signal to achieve an improved phase relationship between the VIN1, VIN2 input voltages and to reduce ripple on the output voltage.

FIG. 10 is a simplified block diagram of a multiphase DC-DC converter 1000 implemented according to an exemplary embodiment of the present invention. The converter 1000 includes a number "N" channels, where N is an integer greater than one. Each channel includes switched-driver logic (SD) 1001, which receives a corresponding one of N PWM signals PWM1–PWMN and converts a corresponding one of N input voltages VIN1–VINN to a single output voltage VOUT. A load 1003 and a load capacitor 1005 are coupled between VOUT and ground and VOUT is fed back to PWM logic 1007 which generates the PWM signals PWM1–PWMN.

The PWM logic 1007 optionally receives the N input voltages VIN1–VINN. The PWM logic 1007 does not need to receive the input voltages if the input voltage for each channel is known or otherwise predetermined, in which case the PWM logic 1007 asserts the PWM1–PWMN signals according to predetermined phase angles. Also, the PWM logic 1007 does not need to receive the input voltages if PLL logic or the like is used to measure and equalize the off-times between the PWM signals.

Alternatively, if any channel receives any one of up to M different known voltages, then the PWM logic 1007 determines which channel receives which voltage level and generates the PWM1–PWMN signals accordingly to optimize phase (e.g., employing the phase selection logic 300 or the digital logic system 800 or the like). Note that the number of possible input voltages "M" may be greater than the actual voltages, e.g., the converter 1000 may include two channels with three possible input voltage levels (e.g., 12V, 5V, 3.3V, etc.) for generating a known output voltage (e.g., 1.25V). If the input voltages are not known, the PWM logic 1007 measures the voltage levels and calculates the appropriate phase angles to optimize phase (e.g., employing the phase selection logic 400 or the like).

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention.

The invention claimed is:

1. A pulse-width modulation (PWM) system that minimizes output ripple of a multiphase DC-DC converter which converts N input voltages including at least one dissimilar input voltage, said PWM system comprising:
   PWM waveform logic that generates N PWM signals including a PWM signal for each of the N input voltages; and
   PWM control logic that optimizes relative phases of said N PWM signals based on voltage levels of the N input voltages.

2. The PWM system of claim 1, wherein said PWM control logic centers pulses of said N PWM signals for each PWM cycle.

3. The PWM system of claim 1, wherein said PWM control logic distributes pulses of said N PWM signals based on predetermined phase angles including at least one phase angle other than 360/N degrees.

4. The PWM system of claim 1, wherein said PWM control logic includes conversion logic that determines input voltage levels and select logic that selects at least one of a plurality of predetermined phase angles.

5. The PWM system of claim 4, wherein said conversion logic comprises an analog to digital converter that determines said input voltage levels from among a plurality of predetermined voltage levels and wherein said select logic comprises a lookup table that stores a plurality of predetermined phase values.

6. The PWM system of claim 4, wherein said conversion logic determines said input voltage levels from a plurality of predetermined voltage levels, digital logic that generates a plurality of phase signals each having a phase angle associated with a combination of said plurality of predetermined voltage levels, and phase select logic that selects from among said plurality of phase signals.

7. The PWM system of claim 6, wherein said conversion logic comprises an analog to digital converter that generates digital values, and wherein said phase select logic comprises a decoder that converts said digital values to corresponding select signals and a multiplexer that selects from among said phase signals based on said select signals.

8. The PWM system of claim 1, wherein said PWM control logic includes conversion logic that measures input voltage levels and computation logic that calculates at least one optimal phase angle based on measured input voltage levels.

9. The PWM system of claim 1, wherein N=2, wherein said PWM waveform logic generates first and second PWM signals, and wherein said PWM control logic comprises:
   detection logic that measures a first delay from termination of each pulse of said first PWM signal and initiation of a next pulse of said second PWM signal and a second delay from termination of each pulse of said second PWM signal and initiation of a next pulse of said first PWM signal; and
   phase-locked loop logic that adjusts phase of said second PWM signal to equalize said first and second delays.

10. The PWM system of claim 1, wherein said PWM control logic comprises phase-locked loop logic that measures and equalizes off-times between consecutive pulses of said N PWM signals.

11. A DC-DC converter, comprising:
   a plurality of channels, each receiving a corresponding one of a plurality of input voltages including at least one dissimilar input voltage, and developing an output voltage using a corresponding one of a plurality of PWM signals; and PWM logic that generates said plurality of PWM signals with optimized phase angles to minimize output ripple.

12. The DC-DC converter of claim 11, wherein said PWM logic equalizes off-times between consecutive pulses of said plurality of PWM signals.

13. The DC-DC converter of claim 12, wherein said PWM logic comprises phase-locked loop logic that measures and equalizes off-times between consecutive pulses of said plurality of PWM signals.

14. The DC-DC converter of claim 11, wherein said plurality of PWM signals includes first and second PWM signals with unequal pulse widths, and wherein said PWM logic shifts said second PWM signal relative to said first PWM signal by a predetermined phase angle.

15. The DC-DC converter of claim 11, wherein said PWM logic includes conversion logic that determines input voltage levels and select logic that determines at least one corresponding phase angle.

16. The DC-DC converter of claim 15, wherein said conversion logic selects from among a plurality of predetermined input voltage levels and wherein said select logic comprises a memory with pre-stored phase values.

17. The DC-DC converter of claim 15, wherein said conversion logic comprises an analog to digital converter that measures said input voltage levels and wherein said select logic comprises computation logic that calculates at least one optimal phase angle based on measured input voltage levels.

18. The DC-DC converter of claim 15, further comprising:
said conversion logic selecting from among a plurality of predetermined input voltage levels;
digital logic that generates a plurality of phase signals based on a master clock signal and associated with combinations of said predetermined input voltage levels; and
said select logic selecting from among said plurality of phase signals.

19. The DC-DC converter of claim 18, wherein said conversion logic comprises an analog to digital converter that generates digital voltage signals, and wherein said select logic comprises a decoder that converts said digital voltage signals to corresponding select signals a multiplexer that selects from among said phase signals based on said select signals.

20. The DC-DC converter of claim 11, wherein said plurality of PWM signals includes first and second PWM signals with unequal pulse widths, and wherein said PWM logic comprises:
detection logic that measures a first delay from termination of each pulse of said first PWM signal and initiation of a next pulse of said second PWM signal and a second delay from termination of each pulse of said second PWM signal and initiation of a next pulse of said first PWM signal; and
phase-locked loop logic that adjusts phase of said second PWM signal to equalize said first and second delays.

21. A method of reducing ripple of a multiphase DC-DC converter that converts N input voltages including at least one dissimilar input voltage, comprising:
generating N pulse-width modulated (PWM) waveforms each corresponding to one of the N input voltages; and
adjusting phase of at least one of the PWM waveforms to achieve an optimal phase relationship in which at least one pulse is initiated at a phase angle other than 360/N degrees during each PWM cycle.

22. The method of claim 21, wherein said adjusting phase comprises centering PWM pulses relative to each other.

23. The method of claim 21, further comprising measuring off-times between consecutive PWM pulses and wherein said adjusting comprises equalizing measured off-times.

24. The method of claim 23, wherein said measuring and equalizing comprises employing a phase-locked loop circuit.

25. The method of claim 21, further comprising:
determining input voltage levels;
determining at least one optimal phase angle based on determined input voltage levels; and
wherein said adjusting phase comprises adjusting phase of at least one PWM waveform based on the at least one optimal phase angle.

26. The method of claim 25, wherein said determining input voltage levels comprises selecting from among a plurality of predetermined voltage levels.

27. The method of claim 26, wherein said determining at least one optimal phase angle comprises reading a phase value from a memory device.

28. The method of claim 26, further comprising generating a plurality of phase signals and wherein said determining at least one optimal phase angle comprises selecting a phase signal based on selected voltage levels.

29. The method of claim 28, wherein said generating a plurality of phase signals comprises dividing a master clock signal by a sufficient number to provide an optimal phase relationship for each expected combination of input voltage levels.

30. The method of claim 25, wherein:
said determining input voltage levels comprises measuring input voltage levels; and
wherein said determining at least one optimal phase angle comprises calculating at least one optimal phase value based on measured input voltage levels.

* * * * *